United States Patent
Luo et al.

(10) Patent No.: US 11,593,315 B2
(45) Date of Patent: Feb. 28, 2023

(54) DATA CLUSTER MIGRATION USING AN INCREMENTAL SYNCHRONIZATION

(71) Applicant: HULU, LLC, Santa Monica, CA (US)

(72) Inventors: Anning Luo, Beijing (CN); Xicheng Dong, Beijing (CN); Quanlong Huang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 208 days.

(21) Appl. No.: 16/453,375

(22) Filed: Jun. 26, 2019

(65) Prior Publication Data

US 2019/0391960 A1    Dec. 26, 2019

Related U.S. Application Data

(60) Provisional application No. 62/690,221, filed on Jun. 26, 2018.

(51) Int. Cl.
G06F 16/17 (2019.01)
G06F 16/18 (2019.01)
G06F 16/178 (2019.01)
G06F 16/182 (2019.01)

(52) U.S. Cl.
CPC ......... *G06F 16/178* (2019.01); *G06F 16/184* (2019.01)

(58) Field of Classification Search
CPC ...... G06F 16/178; G06F 16/184; G06F 16/27; G06F 16/275

USPC ................. 707/610, 620, 623–625
See application file for complete search history.

(56) References Cited

U.S. PATENT DOCUMENTS

| | | | |
|---|---|---|---|
| 8,671,072 B1* | 3/2014 | Shah | G06F 16/178 707/610 |
| 2007/0299882 A1* | 12/2007 | Padgett | G06F 16/178 |
| 2011/0082835 A1* | 4/2011 | Agrawal | G06F 11/1446 707/646 |
| 2013/0167157 A1* | 6/2013 | Daumling | G06F 9/548 719/318 |
| 2015/0358408 A1* | 12/2015 | Fukatani | H04L 67/1097 709/204 |
| 2016/0224259 A1* | 8/2016 | Ahrens | G06F 3/067 |
| 2017/0228411 A1* | 8/2017 | Cadarette | G06F 16/2315 |
| 2019/0205410 A1* | 7/2019 | Goldberg | G06F 16/2246 |

* cited by examiner

*Primary Examiner* — Hares Jami
(74) *Attorney, Agent, or Firm* — Kwan & Olynick LLP (57) ABSTRACT

In some embodiments, during synchronizing of files in a source data set to a destination data set, a method receives a set of events that occurred at the source data set after replicating an image of the source data set to the destination data set. The method analyzes the set of events to determine if an exception to a first set of rules for performing a set of operators on the destination data set for the set of events occurs. A second set of rules for the exception is selected based on analyzing the set of events. The method processes the set of operators for the set of events according to the second set of rules to synchronize data from the first data set to the second data set based on the set of events. The processing of the set of operators uses the second set of rules.

20 Claims, 11 Drawing Sheets

DATA CLUSTER MIGRATION USING AN INCREMENTAL SYNCHRONIZATION

CROSS REFERENCE TO RELATED APPLICATIONS

Pursuant to 35 U.S.C. § 119(e), this application is entitled to and claims the benefit of the filing date of U.S. Provisional App. No. 62/690,221 filed Jun. 26, 2018, the content of which is incorporated herein by reference in its entirety for all purposes.

BACKGROUND

In a data migration within a data center or to a new data center, a system migrates clusters of data, such as a distributed file system (e.g., a Distributed File System (HDFS) clusters (100-200 nodes)). When migrating clusters, one challenge is some clusters have different versions, such as vendor versions. For example, some files are stored on a first vendor's platform and other files are stored on a second vendor's platform. It requires a lot of work to maintain different versions of clusters, but the migration can be used to unify the cluster versions. That is, the system performs the migration that not only migrates the clusters, but switches their versions as well. However, this requires a file level migration that may take a lot of time to migrate.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a data migration system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A data replication system may synchronize data from a source data set to a destination data set. The data replication system may perform a file level replication that replicates files between the source data set to the destination data set. In some embodiments, the file level replication is performed to allow the system to switch versions of some files in the source data set to the destination data set. The data replication process may perform the data synchronization in two stages, which may be referred to as a full synchronization and an incremental synchronization. In the full synchronization, the data replication system may replicate an image of the source data set to the destination data set. During that time, operators are performed on files in the source data set while the synchronization is being performed. These operators may be synchronized on the destination data set during the incremental synchronization.

To perform the incremental synchronization, the data replication system may analyze a set of events that occurred during the full synchronization and replay the events on the destination data set. The replay of the set of events performs operators on the destination data set based on a first set of rules. In some examples, an exception may result for the replay of the set of events. The data replication system may select a second set of rules for the exception based on the analyzing of the set of events. The data replication system may then replay the events according to the second set of rules for the exception where the processing is different from using the first set of rules to perform the synchronization.

System

Figure 1:
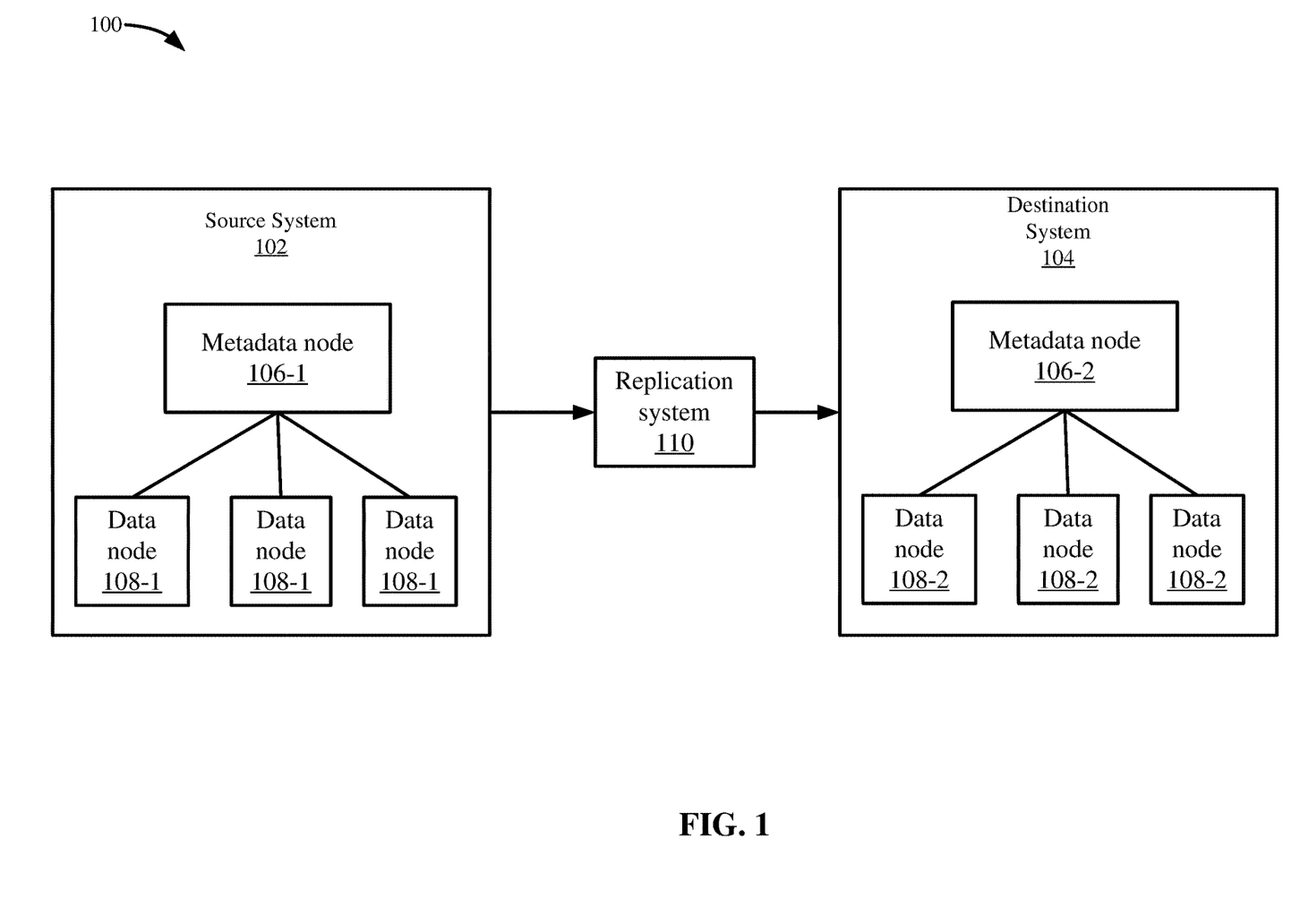
FIG. 1 depicts a simplified system for performing data replication according to some embodiments.

FIG. 1 depicts a simplified system 100 of a method for performing data replication according to some embodiments. System 100 includes a source system 102, a destination system 104, and a replication system 110. Source system 102 may store data that is to be replicated to destination system 104.

Source system 102 may store data that replication system 110 replicates in destination system 104. For example, source system 102 may include a distributed file system that includes files in which replication system 110 replicates in destination system 104. As discussed above, replication system 110 may migrate the files, but also switch the versions of a database system in which the files are stored as well, such as a version of the distributed file system. The version may be the release version of the distributed file system or any other software running on the system. This may require that the replication be performed at the file level. Switching versions may switch from a first version of a database system to a second version of a database system.

This is different from a block-level intra-cluster replication engine that replicates blocks within a cluster.

Source system 102 includes a metadata node 106-1 and data nodes 108-1. Metadata node 106-1 may include metadata for data nodes 108-1. The metadata describes information about the data, such as metadata of the distributed file system (e.g., directory tree of all files in the file system). Metadata node 106-1 does not store the actual data of the data set. Rather, data nodes 108-1 store the data itself.

Replication system 110 may replicate metadata node 106-1 and data nodes 108-1 to destination system 104. For example, destination system 104 includes a metadata node 106-2 and data nodes 108-2 that replicate the metadata and files from source system 102. However, versions of database systems storing some of the files may have been switched in destination system 104. The metadata and data files in destination system 104 should match the metadata and data files in source 102, however.

Replication system 110 may replicate the data in source system 102 in an inter-cluster file level replication that replicates files between data sets that may have different versions for at least a portion of the files. Replication system 110 may divide the replication process into two stages, a full synchronization and an incremental synchronization. The following will discuss replication system 110 in more detail.

Replication System

Figure 2:
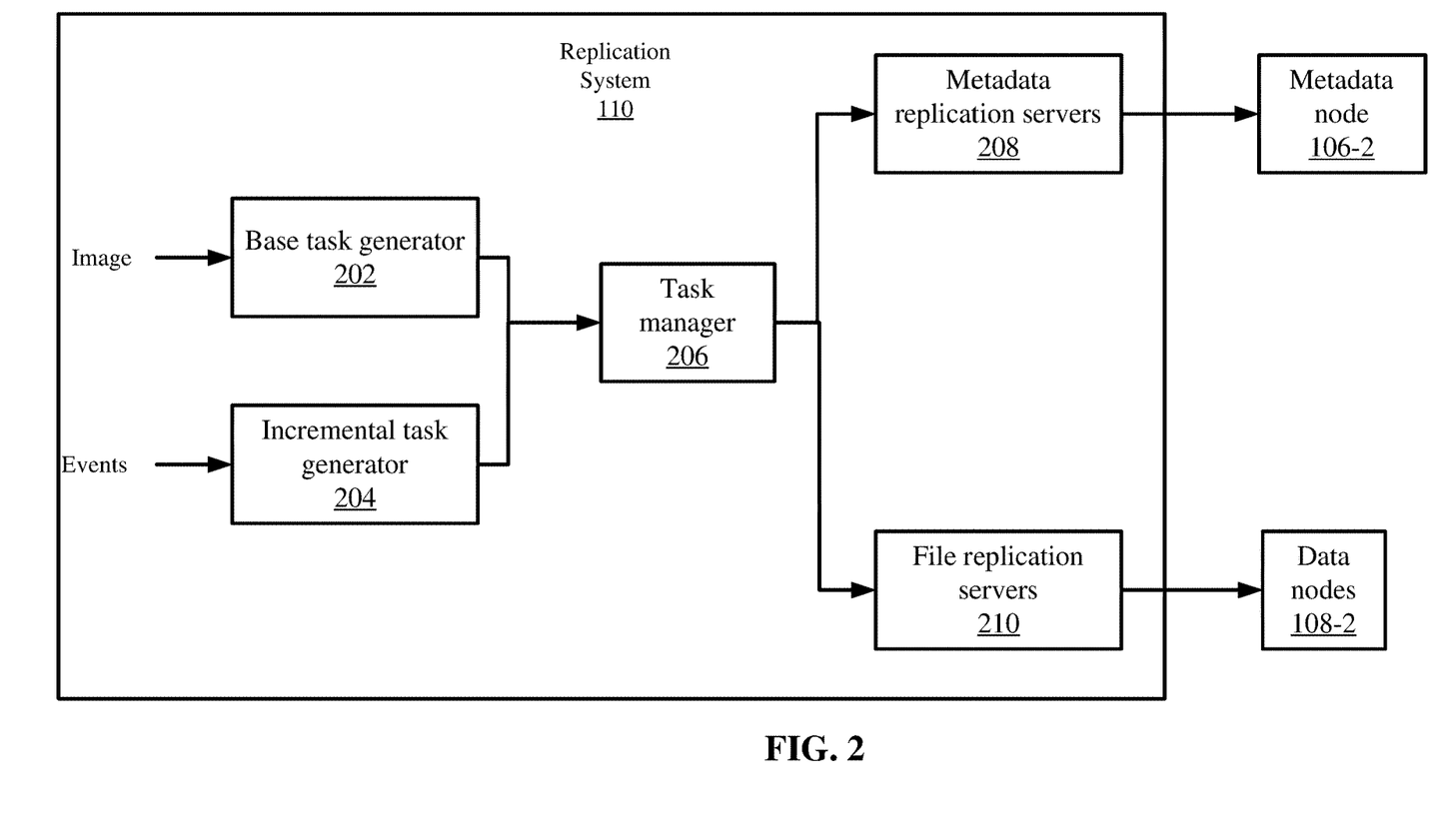
FIG. 2 depicts a more detailed example of a replication system according to some embodiments.

FIG. 2 depicts a more detailed example of replication system 110 according to some embodiments. Replication system 110 includes a base task generator 202 and an incremental task generator 204. Base task generator 202 receives an image of source system 102, which describes the files in data nodes 108-1 and metadata in metadata node 106-1. Base task generator 202 parses the image and creates operators to migrate data nodes 108-1 and metadata node 106-1 to destination system 104.

Incremental task generator 204 receives events that occur on source system 102 after the image of source system 102 is taken. These are events that may change data in data nodes 108-1 or metadata in metadata node 106-1. Then, incremental task generator 204 may determine the changes made to source system 102 and translate these changes into operators for the data or metadata that was replicated to destination system 104. In this case, replication system 110 executes operators on data or metadata in destination system 104 instead of a migration of data from source system 102 to destination system 104. The execution of operators is used because data has already been stored in destination system 104 and a full migration would need to be performed again using another image, which may take a large amount of time. Executing the operators on destination system 104 may synchronize source system 102 and destination system 104 faster than performing another migration from an image. Additionally, after taking the image, the operators that are performed on source system 102 do not specify the exact data to replicate, which means the operators are synchronized in destination system 104.

Task manager 206 receives the operators from base task generator 202 and incremental task generator 204. The operators may include file replication operators and also metadata replication operators. In some embodiments, the file replication process to replicate files is de-coupled from the metadata replication process that replicates metadata. The separation may be because file replication may execute over a longer time, which may block or slow metadata replication if the two were combined. Also, file replication may be dependent on metadata replication and de-coupling the file replication and metadata replication may improve the throughput of data replication because the metadata replication may not delay the file replication.

Accordingly, replication system 110 may include metadata replication servers 208 and file replication servers 210. Metadata replication server 208 may receive metadata replication operators from task manager 206 and file replication server 210 may receive file replication operators from task manager 206. Metadata replication server 208 then performs metadata operators to replicate the metadata from metadata node 106-1 to metadata node 106-2 and file replication server 210 performs file replication operators to replicate data from data nodes 108-1 to data nodes 108-2.

Figure 3:
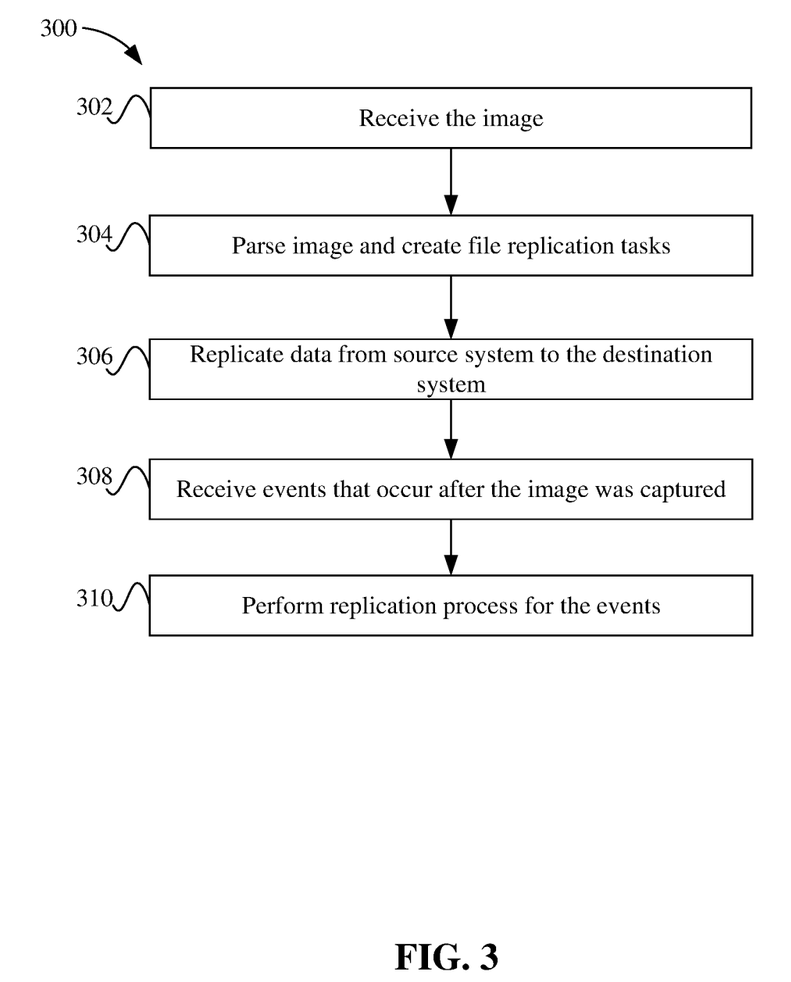
FIG. 3 depicts a simplified flowchart of a method for performing data replication according to some embodiments.

FIG. 3 depicts a simplified flowchart 300 of a method for performing data replication according to some embodiments. At 302, base task generator 202 receives an image of source system 102. At 304, base task generator 202 parses the image and creates file replication tasks. Then, at 306, replication system 110 replicates data from source system 102 to destination system 104. This includes replicating data nodes 108-1 and metadata nodes 106-1.

At 308, incremental task generator 204 receives events that occur after the image was captured. These events may alter portions of source system 102. Then, at 310, replication system 110 performs a replication process for the events after data and metadata for the image is replicated in destination system 104.

Operators

In the incremental synchronization, the operators that are performed on data nodes 102-1 in source data set 102 may be included in a first set of operators. For example, the first set of operators may include a create operator, an append operator, a close operator, a rename operator, an unlink operator, and a metadata operator. The create operator opens a file to create a new file or overwrite the file, or creates a new directory. The append operator opens an existing file and appends data to the existing file. The close operator closes a file after the writing of data to the file is complete. A rename operator renames a file or directory. An unlink operator deletes a file or a directory. A metadata operator modifies metadata of a file or directory. These operators work when altering data in source system 102, but when performing a replication, these types of operators may not work in the incremental synchronization.

The set of events that incremental task generator 204 receives may describe the operator that was performed on source system 102. Replication system 110 may translate the events into a second set of operators, which may be different from the first set of operators. The following Table I describes the translation and relationship between the first set of operators and the second set of operators.

TABLE I

| Second set of operators | First set of operators | Second set of operators explanation |
|---|---|---|
| Sync file | Create File, Append File, Close | Sync a file from the source system to target system. The operator will be translated to create a file operator on target system |
| Sync directory | — | Sync files and directories recursively |
| Create directory | Create (directory) | Create directories and sync its metadata |
| Rename | Rename | Rename directory or file |
| Delete | Unlink | Delete directory or file |
| Sync meta | Metadata | Sync metadata of file or directory |

Some of the operators in the first set of operators may be changed to perform the replication. For the create and append operators, both of these operators open a file. The difference in the operators is how the operators dispose of the existing data in that file. The append operator does not contain any data in offset information, which makes an incremental data synchronization impossible as is being performed by data replication system 110. That is, data replication system 110 may not know where to append the data in data nodes 108-2 because the offset information is not included. So instead of an incremental synchronization for new data, replication system 110 treats the append operator as a signal to synchronize the whole file. This makes the append operator idempotent, which means a request could be sent many times and the result would be identical no matter how many times the request is sent.

The create operator includes a create directory and create file operator, which are different. The create directory may only alter the metadata while a create file will read and write data from source system 102 to destination system 104. The create operator and the append file are combined into the sync file operator. Because a file can be modified until it is closed, replication system 110 synchronizes the whole file once the close operator is received. This avoids having to append data to a file because the whole file may be synchronized once it is closed. The synchronization operator also may synchronize the creation of a directory or a file. When a directory or file is opened, replication system 110 may synchronize the directory and file once the file is closed. Also, the metadata for the directory may be synchronized after receiving the operator to perform from incremental task generator 204.

The following describes a mapping of the second set of operators to the first set of operators. The sync file operator may be mapped to the create file, append file, and close operators. The create file operator, append file operator, and close operator are replaced in the first set of operators with a sync file operator in the second set of operators. The create file operator, append file operator, and close file operator cover a file lifecycle that includes creating a file, writing to a file, and closing a file in source system 102. However, replication process 110 can only start the migration of the file until after the lifecycle is complete and thus the three operators are merged into one operator for the replication process. The sync file operator is needed for the rename operator and using the sync file operator for three operators simplifies the operator logic needed to perform operators on destination system 104. The sync file operator synchronizes a file from source system 102 to destination system 104. The sync file operator may be translated as creating a file or overwriting a file on destination system 104. The sync directory operator does not have a corresponding operator in the first set of operators and synchronizes files and directories recursively. Also, the sync directory operator may be used in place of a rename operator that was performed on source system 102.

The delete operator maps to the unlink operator in the first set of operators and deletes a directory or file. The sync metadata operator maps to the metadata operator and synchronizes the metadata in a file or directory.

The create operator in the first set of operators is split into two operators of the create file operator and the create directory operator in the second set of operators. A create directory operator maps to the create directory operator in the first set of operators. The create directory operator creates directories and synchronizes the metadata for the directories. The create file operator may be executed for an extended period of time, and to control the bandwidth for this operator, the create file operator and the create directory operator are split. That is, the create directory operator may be executed faster and only modifies metadata. The create file modifies the data and the separation from the create file operator may allow the create directory operator to be executed without reliance on the create file operator allowing the create file operator to be reordered.

The set of events is received in an order in which the events occurred. Normally, replication system 110 may follow a first set of rules for processing operators for the set of events. However, in some cases, exceptions to the first set of rules may be encountered, which may require processing of the events according to a second set of rules. For example, the processing of operators according to the first set of rules may result in errors when the operators are applied to destination system 104. Also, there may be opportunities to execute some of the operators for the events out of order, which may speed up the data replication process. These exceptions will be described in more detail below.

Incremental Synchronization

Figure 4:
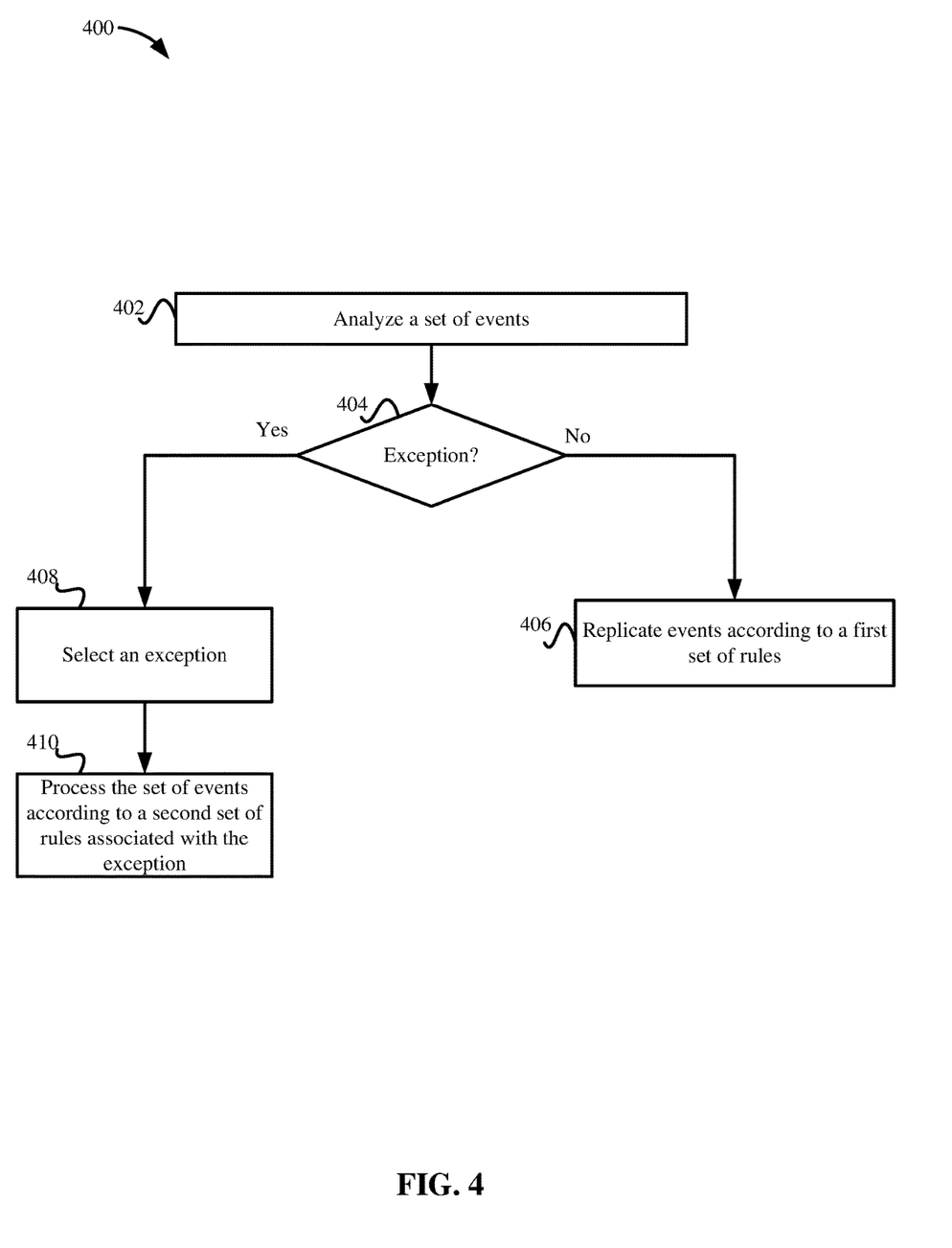
FIG. 4 depicts a simplified flowchart of a method for processing the events that occur after the capturing of an image of a source system according to some embodiments.

After replicating the image of source system 102, destination system 104 includes the data from source system 102. For example, the metadata and files from source system 102 now exist in destination system 104. However, after the image of source system 102 was captured, some events may have occurred to alter source system 102. FIG. 4 depicts a simplified flowchart 400 of a method for processing the events that occur after the capturing of an image of source system 102 according to some embodiments. At 402, replication system 110 analyzes a set of events. Replication system 110 may determine some exceptions occur for the synchronization for the events according to a first set of rules, such as task delay problems or out of order execution problems that may result. At 404, replication system 110 may determine if an exception has been encountered. The exception is encountered based on analyzing the set of events and determining that the set of events match characteristics of the exception, such as certain operations or combinations of operations were performed on source system 102.

If an exception has not been encountered, then at 406, replication system 110 replicates the events according to a first set of rules. For example, the first set of rules may optimize the replication of the events, such as executing the events out of order or without taking into account any task delay execution problems.

However, if replication system 110 determines that an exception occurred, at 408, replication system 110 selects an exception that occurred. For example, different exceptions may occur, such as a task delay exception, a rename operator exception, or an out of order exception. These exceptions will be described in more detail below.

At 410, replication system 110 processes the set of events according to a second set of rules that are associated with the exception. The second set of rules is different from the first set of rules and may be specific to processing the exception.

Exception Processing

The following will describe different exceptions that may occur in the replication process. For example, a task delay exception, a rename operator exception, and an out of order execution exception will be described. It will be understood that other exceptions may also be appreciated.

Figure 5A:
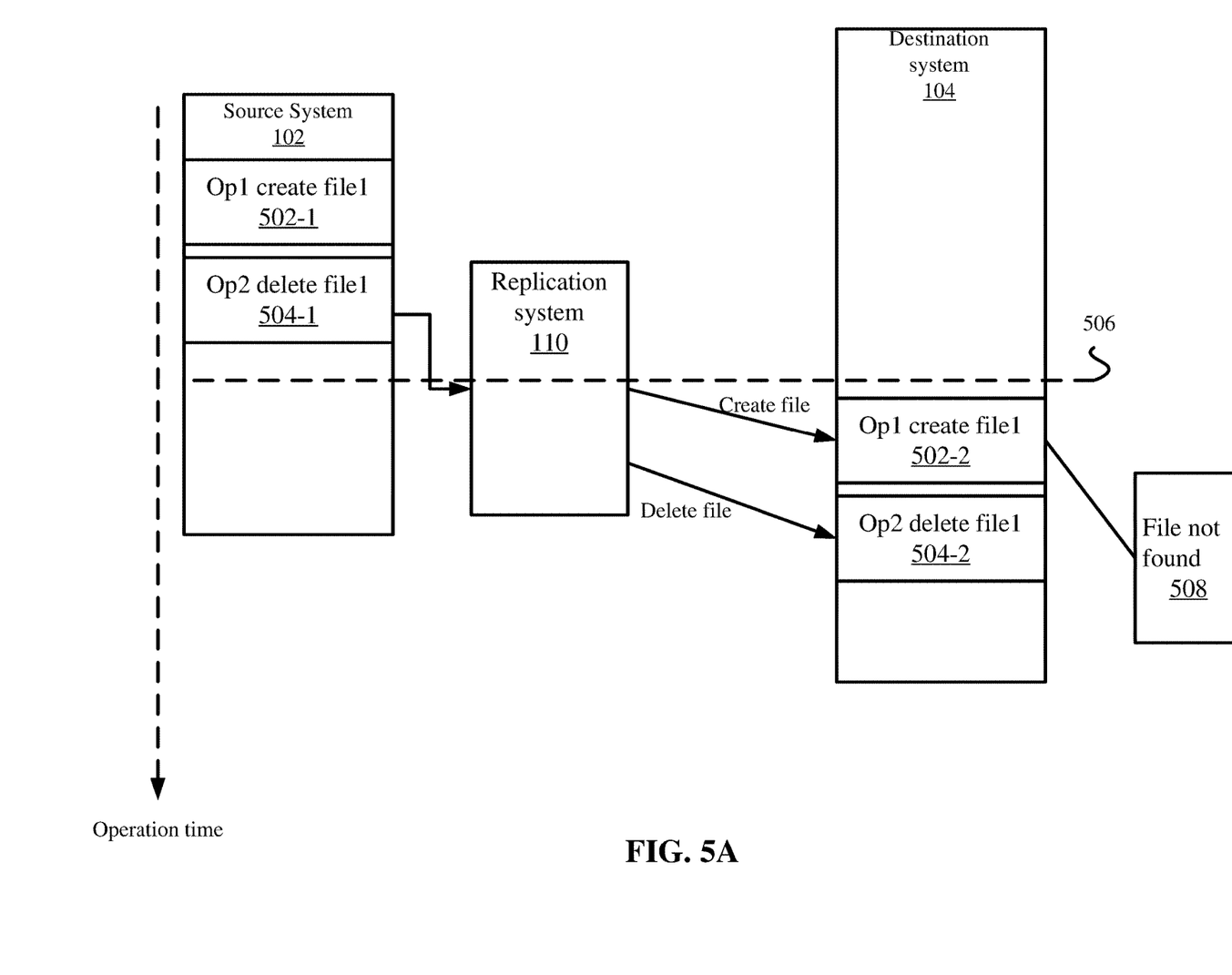
FIG. 5A depicts an example processing using a first set of rules where an exception occurs because of a delay in execution of a task during the incremental synchronization.

FIG. 5A depicts an example processing using a first set of rules where an exception occurs because of a delay in execution of a task during the incremental synchronization. In source system 102, an operator Op1 and a second operator Op2 are performed where an operation time indicates that operator Op1 is performed before operator Op2. Operator Op1 may be a create file1 operator 502-1 and operator Op2 may be a delete file1 operator 504-1. The create file1 operator may create a file "file 1" and then the delete file1 may delete the file file1. For example, the operator may create a file in a path /tmp/file1 which creates a file "file" in a directory tmp. Then, operator Op2 may delete the file in a path /tmp/file1, which deletes file "file" in the directory tmp.

At a point in time shown at 506, replication system 110 may receive events for the operators performed in source system 102 and start to synchronization the operators in destination system 104. In FIG. 5A, if replication system 110 performs a create file operator for operator Op1 at 502-2 in destination system 104, the delay in performing this operator in destination system 104 may make the create file operator invalid. For example, at 508, replication system 110 may encounter a file not found exception when performing the create file1 operator at 504-2. The file not found exception is received because when replication system 110 attempts to create file1, the file file1 does not exist in source system 102 anymore because operator Op2 at 504-1 deleted file1 in source system 102 before replication system 110 executed the create file operator at 502-2. Accordingly, there is no data for file1 in source system 102 that replication system 110 can use to copy file1 to destination system 104. Also, the create file1 operator will never be successful by replication system 110 even if re-tried. Further, a similar exception will occur with operator Op2 delete file1 as there is no file1 in destination system 104 to delete.

Figure 5B:
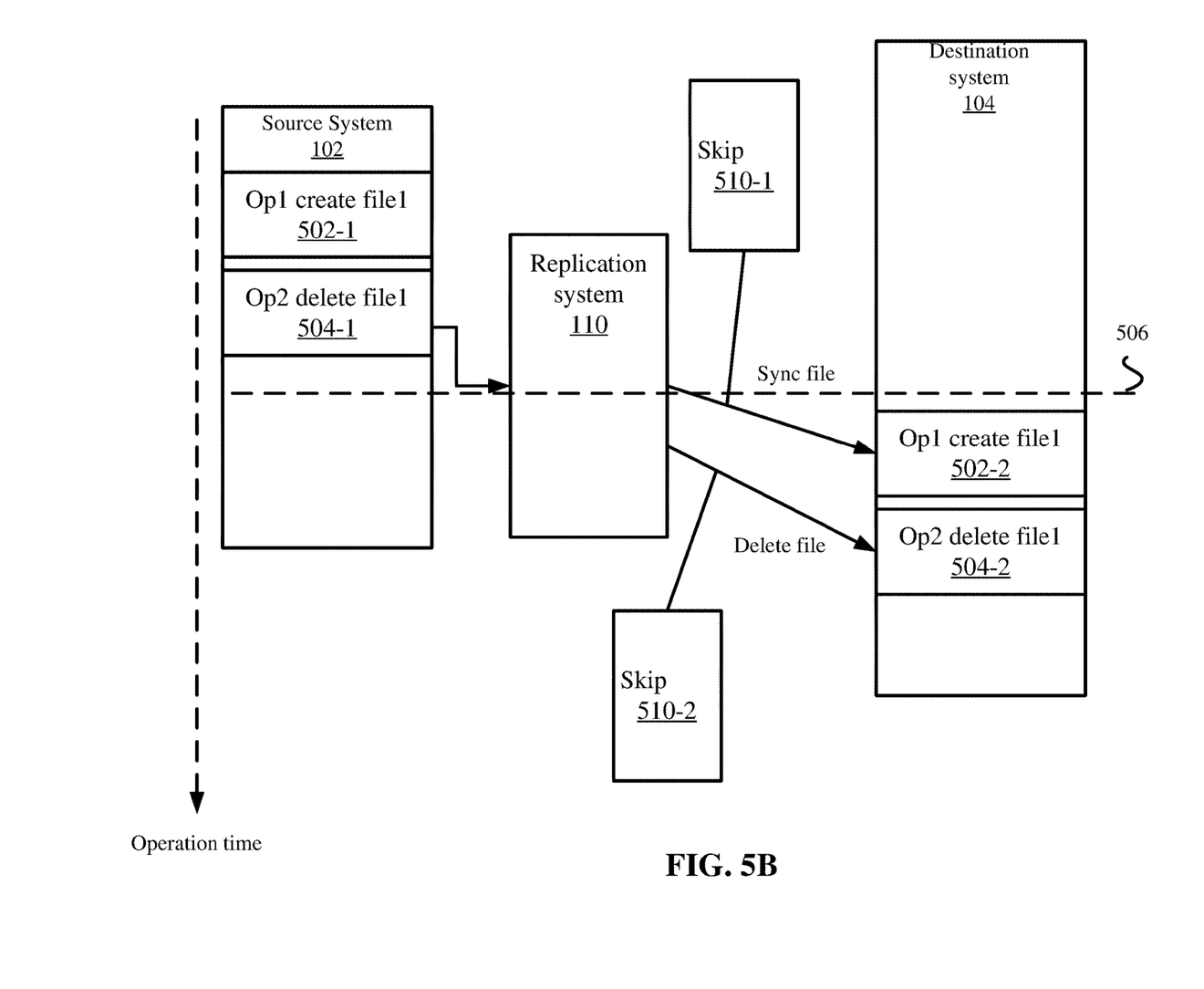
FIG. 5B depicts an example of processing using a second set of rules to process the delay exception according to some embodiments.

FIG. 5B depicts an example of processing using a second set of rules to process the delay exception according to some embodiments. Replication system 110 may add a validation step for operators to check whether an operator is obsolete when its execution fails. If the validation returns false, then replication system 110 may stop executing or attempting to execute the operator. This avoids repeatedly executing operators that may never have a chance of being successfully executed. When the operator Op1 create file1 at 502-2 fails, replication system 110 may perform a validation step to determine if operator Op1 is obsolete and will never be successfully executed. For example, replication system 110 may scan source system 102 for file file1 determine whether the file exists in source system 102. If so, then replication system 110 marks operator Op1 with a status of skip at 510-1. When an operator is marked as skip, then replication system 110 does not attempt to execute the operator anymore, which limits the number of retries of the operator that may normally happen with the first set of rules. Similarly, when operator Op2 delete file1 fails because there is no file1 in source system 102 to delete, replication system 110 marks this file as skipped at 510-2.

Figure 6A:
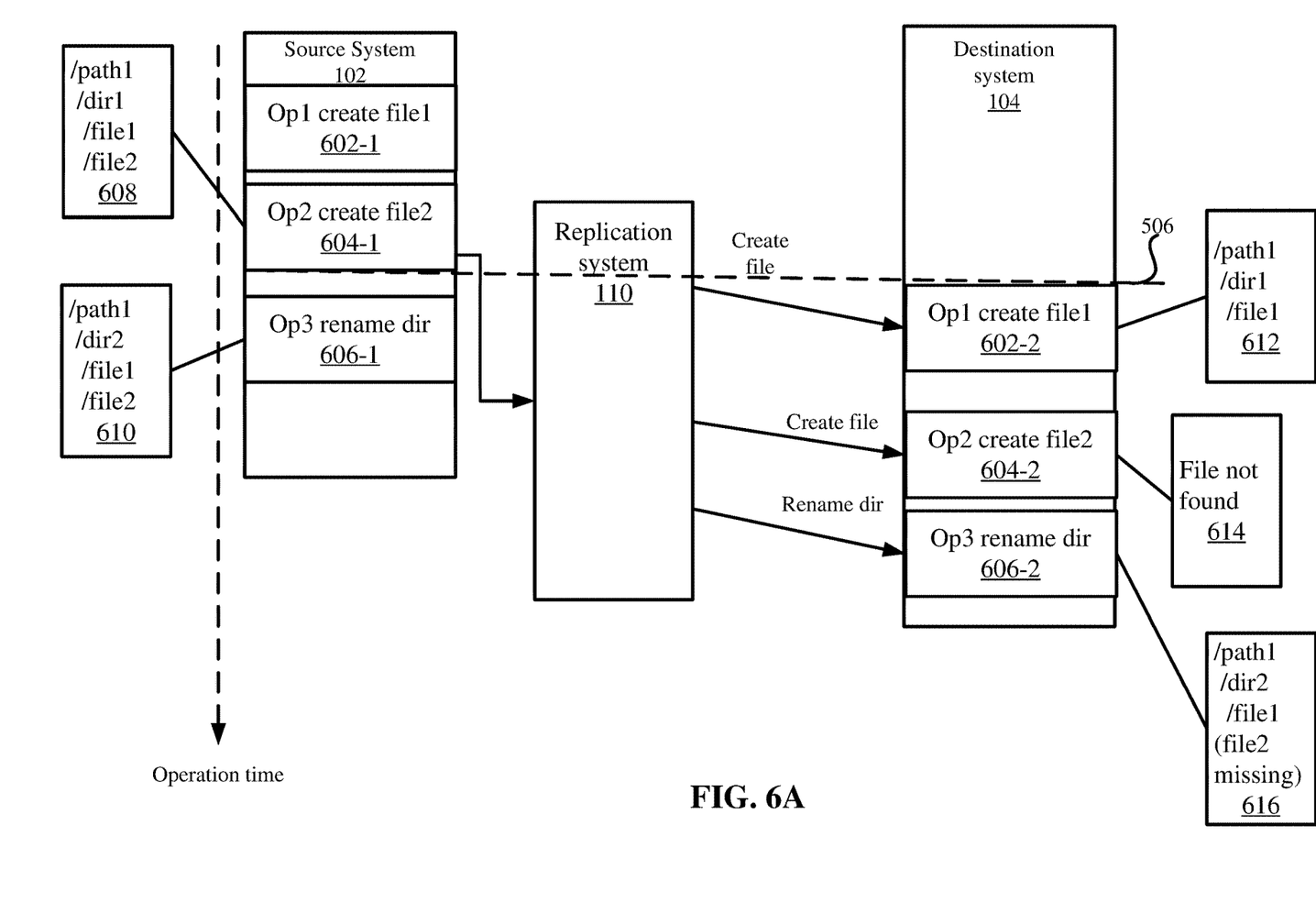
FIG. 6A depicts an example of processing the rename operator according to a first set of rules that encounter an exception.

FIG. 6A depicts an example of processing the rename operator according to a first set of rules that encounter an exception. Source system 102 executes three operators that create two files and then rename the directory in which the two files were created. For example, if an operator Op1 create file1 at 602-1 creates a file in a directory dir1, then an operator Op2 creates a file1 at 604-1 in the same directory dir1. Then, an operator Op3 rename dir at 606-1 renames the directory dir1 to a directory dir2. The result of the operators is shown at 608, where a directory dir1 includes a file1 and a file2. Then, at 610, when directory dir1 is renamed to directory dir2, the path is changed from /path1/dir1/file1 and /path1/dir1/file2 to /path1/dir2/file1 and path1/dir2/file2, respectively. That is, file file1 and file file2 have now been moved to a different directory dir2.

Replication system 110 may receive events for these operators and then replicate the operators in the incremental synchronization. For example, at 602-2, replication system 110 may perform a create file operator for operator Op1 to create file1. The file file1 exists in directory dir1 in source system 102 at this time because source system 102 has not performed operator Op3 at 606-1 to rename the directory from dir1 to dir2. Consequently, at 612, replication system 110 creates file1 in destination system 104 with a path /path1/dir1/file1.

Replication system 110 may perform the create file command for file2 at 604-2 after operator Op3 at 606-1 for renaming of directory dir1 to dir2 was performed in source system 102. As seen, operator Op2 at 604-2 is after the time 506 in which replication system 110 starts to replicate the set of events in destination system 104. Accordingly, at 614, a file not found exception is received. Then, replication system 110 performs the rename directory operator Op3 at 606-2 in destination system 104, which renames directory dir1 to dir2. After performing this incremental synchronization, directory dir2 exists in destination system 104, but only includes file1. At 616, the path /path1/dir2/file1 exists, but file file2 is missing from directory dir2.

Figure 6B:
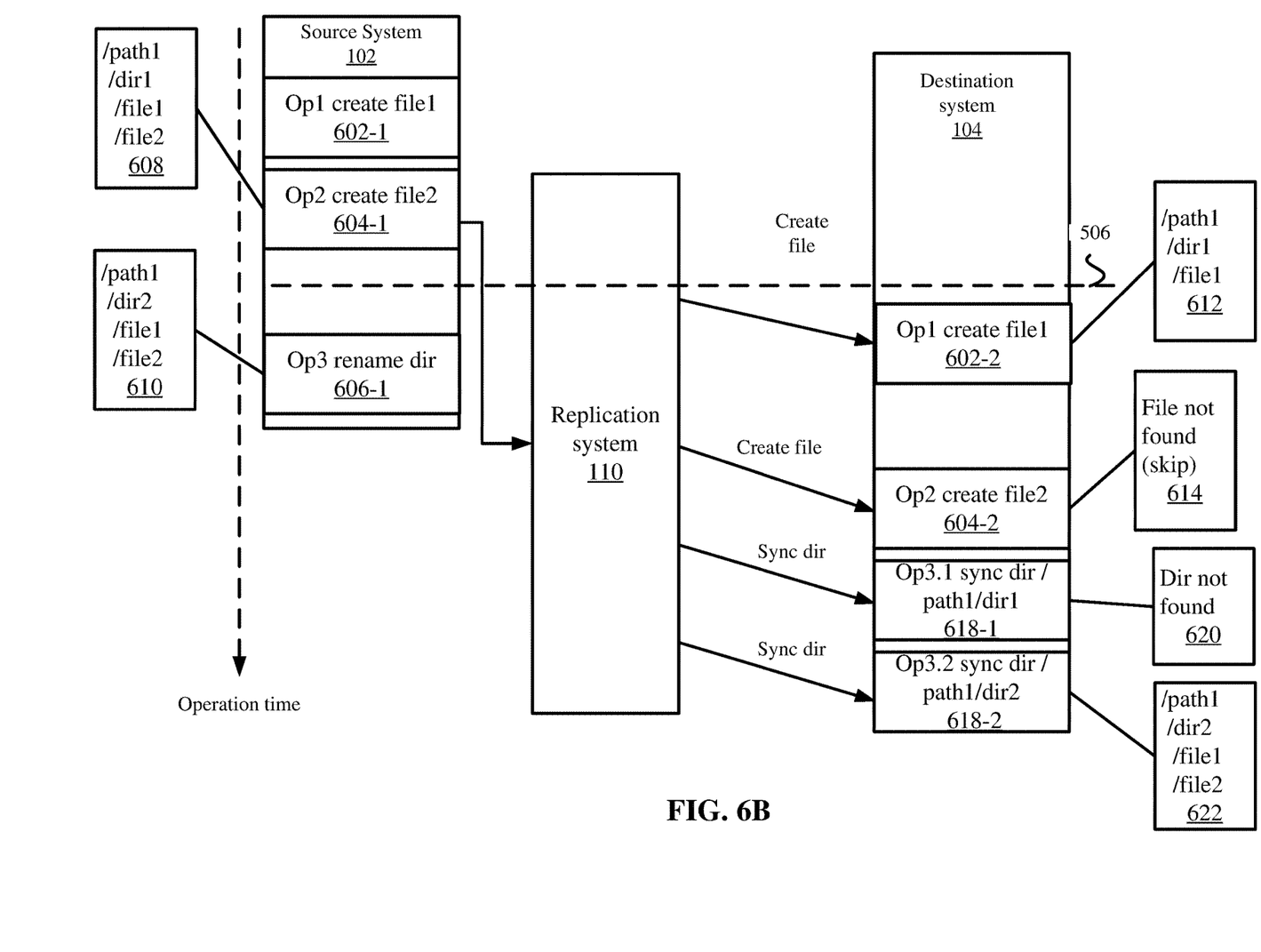
FIG. 6B shows the processing of the rename operator according to a second set of rules for the exception according to some embodiments.

FIG. 6B shows the processing of the rename operator according to a second set of rules for the exception according to some embodiments. Source system 102 performs the same operators as in FIG. 6A; however, in destination system 104, replication system 110 splits the rename directory operator into two sync directory operators. The rename directory operator is split into two sync directory operators. The sync directory operators may sync the directories for the two directories dir1 and dir2. That is, a first sync directory operator synchronizes the first directory and a second sync directory operator synchronizes the second directory. For example, at 618-1, replication system 110 performs a sync directory operator for directory dir1 that syncs the directory for /path1/dir, which is not found in source system 102 because the directory has been renamed. At 620, the error of "directory not found" at 620 is received. During a validation step, replication system 110 can determine that this directory is not found in source system 102 and thus the operator is not repeated again and marked as skip.

Replication system 110 then performs a second sync directory operator at 618-2 to sync directory dir2 at a path /path1/dir2. Directory dir2 exists in source system 102 and then replication system 110 synchronizes the entire directory dir2. This results in syncing the path /path1/dir2/file1 and /path1/dir2/file2 under directory dir2 and both files file1 and file2 are now included in destination system 104. In the above, the rename operator becomes idempotent when split into two sync directory operators. That is, the rename operator no longer depends on the file operator because a directory will be synced when it is renamed.

Figure 7A:
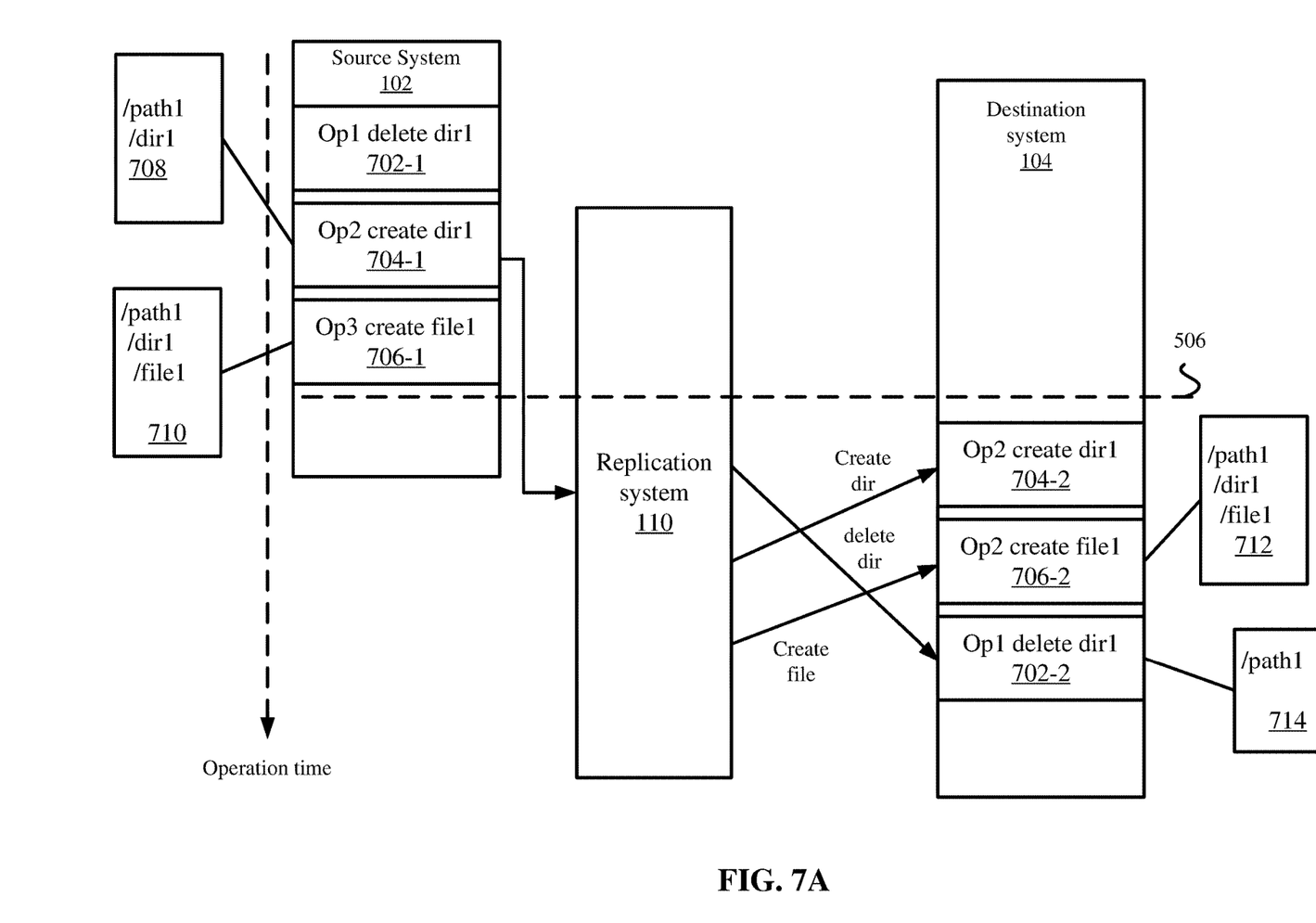
FIG. 7A shows an example of processing the operators out of order according to a first set of rules.

Another exception to the first set of rules occurs when the task execution order remains important and some operators cannot be executed out of order. FIG. 7A shows an example of processing the operators out of order according to a first set of rules. Source system 102 may perform a first operator Op1 for deleting a directory at 702-1. Operator Op1 deletes a directory dir1 in a path of /path1/dir1. Then, source system 102 performs a second operator Op2 for creating a directory at 704-1, and a third operator Op3 for creating a file file1 in the directory dir1. Operator Op2 creates a file in the path of /path1/dir1. Similarly, operator Op3 creates a file. At 710, operator Op3 creates a file file1 in the directory dir1 and a path /path1/dir1/file1.

Replication system 110 may execute these operators out of order, but the out of order execution may result in an error. For example, replication system 110 performs a create directory operator Op2 at 704-2 first, which creates directory dirt. Then, replication system 110 performs a create file operator Op2 at 706-2 that creates file1 in directory dir1 as shown at 712. After performing the create file operator, replication system 110 performs the delete directory operator Op1 at 702-2. This deletes directory dir1 at 714. Accordingly, no directory dir1 exists in destination system 104 while directory dir1 exists in source system 102.

Figure 7B:
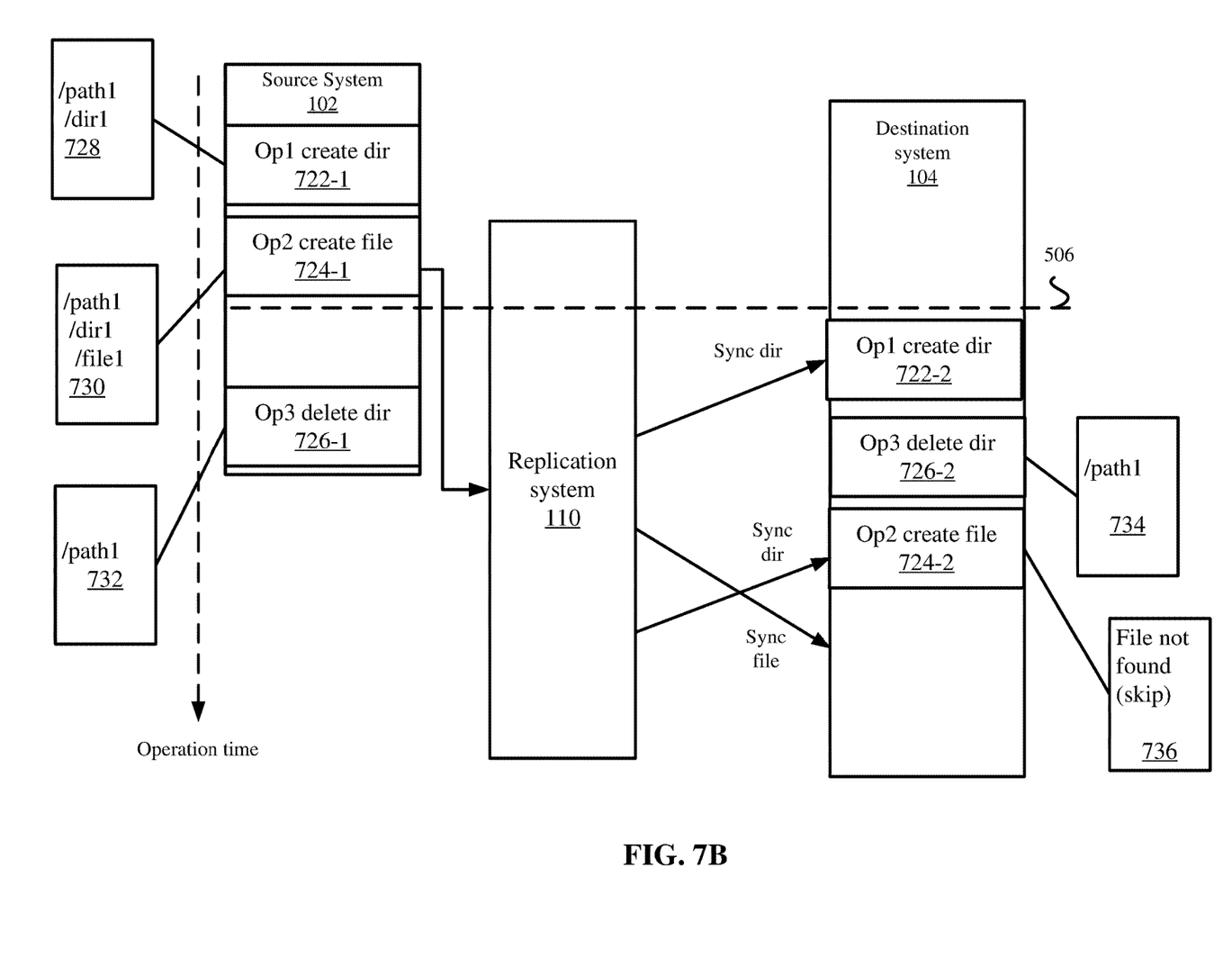
FIG. 7B shows an example of processing the operators according to a second set of rules where execution order remains important according to some embodiments.

FIG. 7B shows an example of processing the operators according to a second set of rules where execution order remains important according to some embodiments. In some embodiments, the second set of rules may state that the order of metadata operators should not be changed. However, if a data operator happens after a metadata operator, the data operator does not move before that metadata operator. Also, a data operator can be postponed after any metadata operators and any neighboring data operators may exchange their order. The metadata operator manipulates metadata executing a metadata operator interacts with metadata without manipulating any data. Metadata operators may include the sync directory, create directory, delete, rename, and sync operators. A data operator may be a sync file operator. The create file operator is a data operator and cannot move before the metadata operator of Op1 delete dir.

Source system 102 performs three operators of an operator Op1 create dir at 722-1, an operator Op2 create file at 724-1, and an operator Op3 delete dir at 726-1. These operators create a directory dir1 at a path /path1/dir1 at 728, then create a file file1 in directory dir1 at 730, and then delete directory dir1 at 732.

In destination system 104, replication system 110 may execute operator Op3 out of order with respect to operator Op2. Replication system 110 performs a sync directory operator for operator Op1 at 722-2. The sync directory operator creates a directory dir1. Then, replication system 110 performs a sync directory operator for operator Op3 delete dir at 726-2. Then, the sync directory operator deletes the directory dir1. At 734, directory dir1 has been deleted. Then, replication system 110 performs a sync file operator for operator Op2 create file at 724-2. The syncing of file file1 in directory dir1 does not return a file because the directory dir1 and file file1 in source system 102 does not exist. Accordingly, at 736, replication system 110 receives a file not found and skips this operator upon validation. The result is that destination system 104 does not include directory dir1 and the state of destination system 104 is the same as source system 102. Accordingly, the operators Op2 and Op3 may be executed out of order. This is because the delete directory and create file operators can be exchanged because the sync file operator happens before the delete directory operator and a data operator can be postponed after any metadata operator. Thus, the create file is a data operator and it can be postponed after the metadata operator.

Validation Process

Replication system 110 may also validate the replication that is performed. In some embodiments, replication system 110 may perform a diff operator between source system 102 and destination system 104 after replication system 110 performs the incremental replication. The diff operator may determine a difference in either the metadata node or data nodes. In some embodiments, the validation process may parse an image from both source system 102 and destination system 104 for differences. Also, the validation process may compare the metadata of tree nodes recursively without examining the file content. Then, the validation process may compare the content in source system 102 and destination system 104 to determine whether or not the same content exists at the data level. The validation process may use check sums to validate the content is the same in both source system 102 and destination system 104.

Conclusion

Replication system 110 replicates data from source system 102 and destination system 104 at the file level, which allows replication system 110 to change versions of the systems in which files are stored. Replication system 110 may process operators received after the replication of an image according to a first set of rules. However, replication system 110 may encounter exceptions to the first set of rules and can perform special processing based on a second set of rules for the exceptions. This may address any problems that result during the replication.

System

Figure 8:
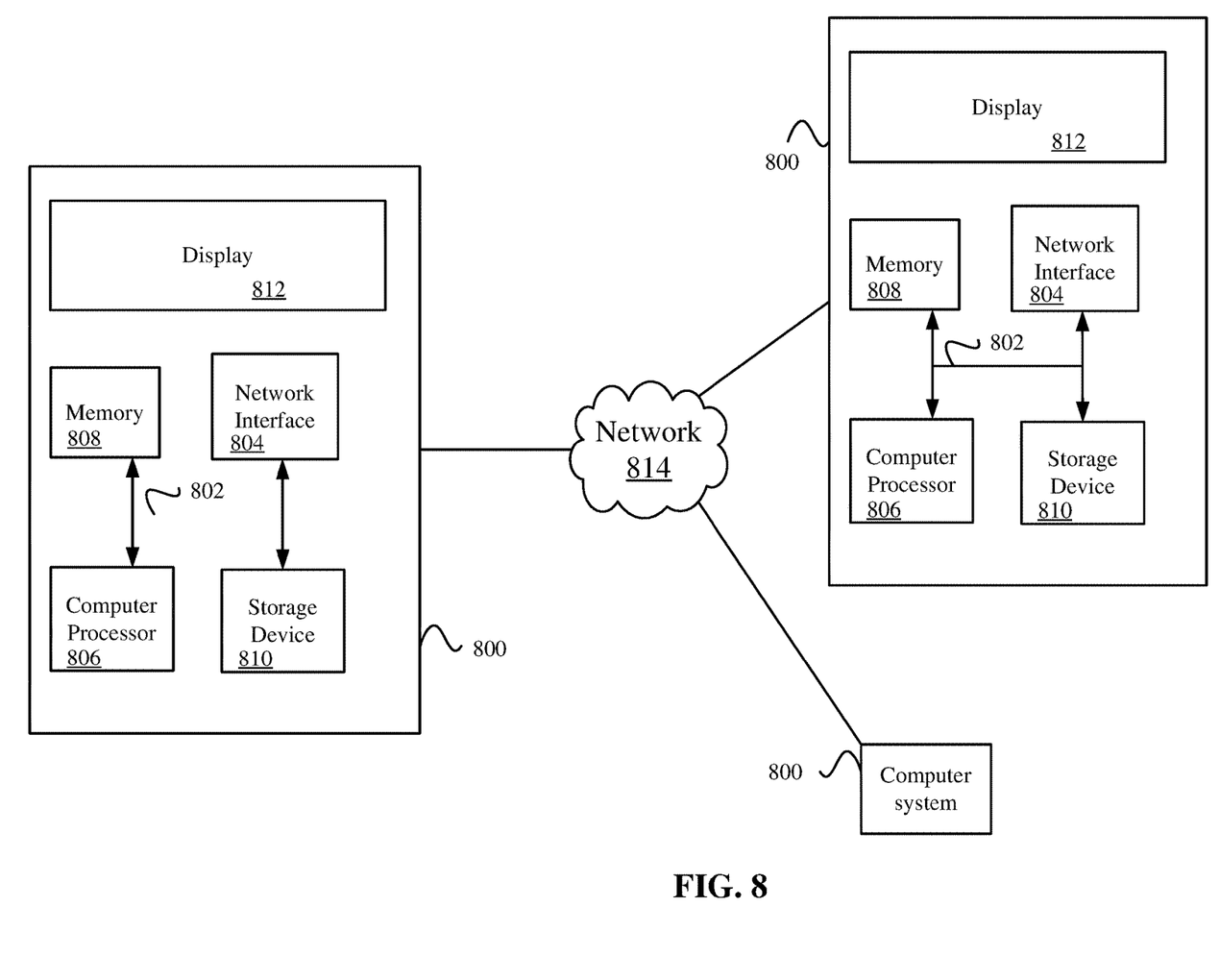
FIG. 8 illustrates an example of special purpose computer systems according to some embodiments.

FIG. 8 illustrates an example of special purpose computer systems 800 according to some embodiments. Computer system 800 includes a bus 802, network interface 804, a computer processor 806, a memory 808, a storage device 810, and a display 812.

Bus 802 may be a communication mechanism for communicating information. Computer processor 806 may execute computer programs stored in memory 808 or storage device 808. Any suitable programming language can be used to implement the routines of some embodiments including C, C++, Java, assembly language, etc. Different programming techniques can be employed such as procedural or object oriented. The routines can execute on a single computer system 800 or multiple computer systems 800. Further, multiple computer processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The non-transitory computer-readable storage medium contains instructions for controlling a computer system 800 to be configured to perform functions described by some embodiments. The instructions, when executed by one or more computer processors 806, may be configured to perform that which is described in some embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of some embodiments may be distributed across computer systems 800 through network 814.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   performing, by a computing device, a replication process using an image of a first data set to replicate the image of the first data set to a second data set;
   receiving, by the computing device, a set of events that occurred to alter data in the first data set after the image of the first data set is taken, wherein the set of events describes a set of operators that was performed on the first data set;
   analyzing, by the computing device, the set of events to determine if an exception to a first set of rules for performing the set of operators on the second data set for the set of events occurs, wherein the exception occurs when one or more of the set of operators are processed for the set of events after a delay, and wherein the delay from performing an operator in the set of operators is a result of a file not existing in the first data set when performing the operator in the set of operators;
   selecting, by the computing device, a second set of rules for the exception based on analyzing the set of events; and
   processing, by the computing device, the set of operators for the set of events according to the second set of rules on the second data set to synchronize data from the first data set to the second data set, the processing of the set of operators using the second set of rules being different from processing of the set of operators using the first set of rules, wherein processing the set of operators according to the second set of rules comprises:
   performing a validation process to validate whether the file is in the first data set, and
   marking an operator in the one or more of the set of operators as an operator to skip when the file is not existing in the first data set.

2. The method of claim 1, further comprising:
   selecting the exception from a plurality of exceptions.

3. The method of claim 2, wherein each exception in the plurality of exceptions is associated with a different second set of rules.

4. The method of claim 1, wherein:
   the file not existing in the first data set is deleted, and
   the operator in the set of operators is processed to create the file in the second data set after the file in the first data set is deleted.

5. The method of claim 1, wherein when the operator in the one or more of the set of operators is marked as the operator to skip, the operator in the one or more of the set of operators is not processed again.

6. The method of claim 1, wherein:
   the exception occurs when an operator in the set of operators is for a rename of a first directory to a second directory that results in not synchronizing a file in the first data set to the second data set.

7. The method of claim 6, wherein processing the set of operators according to the second set of rules comprises:
   splitting a rename directory operator in the set of events into a first sync directory operator that synchronizes files in the first directory and a second sync directory operator that synchronizes files in the second directory.

8. The method of claim 7, wherein:
   the first sync directory operator synchronizes all files in the first directory from the first data set to the second data set, and
   the second sync directory operator synchronizes all files in the second directory from the first data set to the second data set.

9. The method of claim 1, wherein:
   the exception occurs when one or more operators are processed out of order for the set of events resulting in an error in processing the set of operators.

10. The method of claim 9, wherein:
    an order of metadata operators is not changed in the second set of rules,
    a data operator is not moved before a metadata operator,
    a data operator is moveable to after the metadata operator, and
    neighboring data operators can exchange order in the set of operators.

11. The method of claim 9, wherein:
    a delete directory operator in the set of operators is processed out of order with a create file operator in the set of operators.

12. A non-transitory computer-readable storage medium having stored thereon computer executable instructions, which when executed by a computing device, cause the computing device to be operable for:
    performing a replication process using an image of a first data set to replicate the image of the first data set to a second data set;
    receiving a set of events that occurred to alter data in the first data set after the image of the first data set is taken, wherein the set of events describes a set of operators that was performed on the first data set;

analyzing the set of events to determine if an exception to a first set of rules for performing the set of operators on the second data set for the set of events occurs, wherein the exception occurs when one or more of the set of operators are processed for the set of events after a delay, and wherein the delay from performing an operator in the set of operators is a result of a file not existing in the first data set when performing the operator in the set of operators;

selecting a second set of rules for the exception based on analyzing the set of events; and processing the set of operators for the set of events according to the second set of rules on the second data set to synchronize data from the first data set to the second data set, the processing of the set of operators using the second set of rules being different from processing of the set of operators using the first set of rules, wherein processing the set of operators according to the second set of rules comprises:

performing a validation process to validate whether the file is in the first data set, and marking an operator in the one or more of the set of operators as an operator to skip when the file is not existing in the first data set.

13. The non-transitory computer-readable storage medium of claim 12, wherein:

the exception occurs when an operator in the set of operators is for a rename of a first directory to a second directory that results in not synchronizing a file in the first data set to the second data set.

14. The non-transitory computer-readable storage medium of claim 13, wherein processing the set of operators according to the second set of rules comprises:

splitting a rename directory operator in the set of events into a first sync directory operator that synchronizes files in the first directory and a second sync directory operator that synchronizes files in the second directory.

15. The non-transitory computer-readable storage medium of claim 12, wherein:

the exception occurs when one or more operators are processed out of order for the set of events resulting in an error in processing the set of operators.

16. The non-transitory computer-readable storage medium of claim 15, wherein:

an order of metadata operators is not changed in the second set of rules, a data operator is not moved before a metadata operator, a data operator is moveable to after the metadata operator, and neighboring data operators can exchange order in the set of operators.

17. The non-transitory computer-readable storage medium of claim 12, wherein:

the file not existing in the first data set is deleted, and the operator in the set of operators is processed to create the file in the second data set after the file in the first data set is deleted.

18. The non-transitory computer-readable storage medium of claim 12, wherein when the operator in the one or more of the set of operators is marked as the operator to skip, the operator in the one or more of the set of operators is not processed again.

19. The non-transitory computer-readable storage medium of claim 12, further operable for:

selecting the exception from a plurality of exceptions.

20. An apparatus comprising:

one or more computer processors; and a computer-readable storage medium comprising instructions for controlling the one or more computer processors to be operable for:

performing a replication process using an image of a first data set to replicate the image of the first data set to a second data set;

receiving a set of events that occurred to alter data in the first data set after the image of the first data set is taken, wherein the set of events describes a set of operators that was performed on the first data set;

analyzing the set of events to determine if an exception to a first set of rules for performing the set of operators on the second data set for the set of events occurs, wherein the exception occurs when one or more of the set of operators are processed for the set of events after a delay, and wherein the delay from performing an operator in the set of operators is a result of a file not existing in the first data set when performing the operator in the set of operators;

selecting a second set of rules for the exception based on analyzing the set of events; and processing the set of operators for the set of events according to the second set of rules on the second data set to synchronize data from the first data set to the second data set, the processing of the set of operators using the second set of rules being different from processing of the set of operators using the first set of rules, wherein processing the set of operators according to the second set of rules comprises:

performing a validation process to validate whether the file is in the first data set, and marking an operator in the one or more of the set of operators as an operator to skip when the file is not existing in the first data set.

* * * * *